United States Patent [19]

Chiou

[11] Patent Number: 4,995,250

[45] Date of Patent: Feb. 26, 1991

[54] COMBINATION LOCK FOR THE SHIFT ROD AND THE HAND-BRAKE ROD OF A CAR

[76] Inventor: Chuang C. Chiou, #34 Badding 1: Street, Taoyuan City, Taiwan

[21] Appl. No.: 406,684

[22] Filed: Sep. 13, 1989

[51] Int. Cl.⁵ .............................................. E05B 65/12
[52] U.S. Cl. ...................................... 70/238; 70/198; 70/202; 70/23
[58] Field of Search ................. 70/238, 237, 198, 199, 70/23, 258

[56] References Cited

U.S. PATENT DOCUMENTS

| | | | |
|---|---|---|---|
| 512,979 | 1/1854 | Lowrie | 70/23 |
| 1,555,229 | 9/1925 | Offelder | 70/23 |
| 3,435,646 | 4/1969 | Michnoff | 70/238 X |
| 4,747,279 | 5/1988 | Solow | 70/199 X |
| 4,835,999 | 6/1989 | Chant | 70/202 X |
| 4,848,110 | 7/1989 | Kuo | 70/238 X |

FOREIGN PATENT DOCUMENTS

| | | | |
|---|---|---|---|
| 332623 | 12/1919 | Fed. Rep. of Germany | 70/23 |
| 807760 | 7/1951 | Fed. Rep. of Germany | 70/238 |
| 2710444 | 9/1978 | Fed. Rep. of Germany | 70/238 |
| 495065 | 6/1919 | France | 70/238 |
| 2080873 | 2/1982 | United Kingdom | 70/238 |
| 2142887 | 1/1985 | United Kingdom | 70/198 |

Primary Examiner—Robert L. Wolfe
Assistant Examiner—Suzanne L. Dino
Attorney, Agent, or Firm—Asian Pacific Int'l Patent and Trademark Office

[57] ABSTRACT

It is combination lock, in which the main rod is made of steel, while the movable sleeve is made of copper. The main rod is mounted with five combination rings. The lock is to be mounted between the shift rod and the hand-brake handle so as to prevent a burglar from operating the shift and releasing the hand-brake normally.

3 Claims, 3 Drawing Sheets

COMBINATION LOCK FOR THE SHIFT ROD AND THE HAND-BRAKE ROD OF A CAR

BACKGROUND OF THE INVENTION

The fast material civilization development has greatly elevated our daily living standards; for instance, any person can afford to have a car. The car-stealing cases have been increased each year as a result of the increase of car owners. The society security, the rights of the insurance company and the car owners have been jeapardized. There have been several kinds of car locks, such as the steering lock, a stick lock, an electronic lock, etc.; all these locks have been developed with improvements one way or the other so as to obtain a satisfactory way to prevent a car from being stolen. Unfortunately, all the aforesaid locks still can not prevent a car from being stolen.

SUMMARY OF THE INVENTION

This invention provides a combination lock for the automobile; it is a combination for the shift rod and the hand-brake rod. The combination lock mainly comprises a main rod made of steel, and a movable sleeve made of copper; the main rod is mounted with several combination rings in a retractable manner. The lock according to the present invention can prevent the burglar from disassembling or demolition, and since the lock is to be mounted between the shift rod and the hand-brake rod, both the shift rod and the hand-brake rod cannot be operated normally; therefore, a car with this lock can prevent a burglar from stealing the car.

DETAILED DESCRIPTION

The prime object of the present invention is to provide a combination lock for the shift rod and the hand-brake rod of a car; the main structure of the combination lock comprises a steel main rod with a copper sleeve, and several combination rings. The lock according to the present invention is reliable, and difficult to be demolished by a picker.

Another object of the present invention is to provide a combination lock, which comprises five combination rings for generating about 100 thousands of combination variation. This lock has a strong structure without key, and it can only be unlocked with its combination set; otherwise, it would be very difficult to unlock.

Still another object of the present invention is to provide a combination lock, which can lock up the shift rod and the hand-brake rod simultaneously to have them not operated normally so as to prevent a car from being stolen.

A further object of the present invention is to provide a combination lock, which has a strong structure, a beautiful appearance, and which is portable and easy to manufacture at a lower cost. It would become much popular among the car owners, and would prevent the car burglar from stealing a car; indirectly, it can provide our society with better security.

Figure 1:
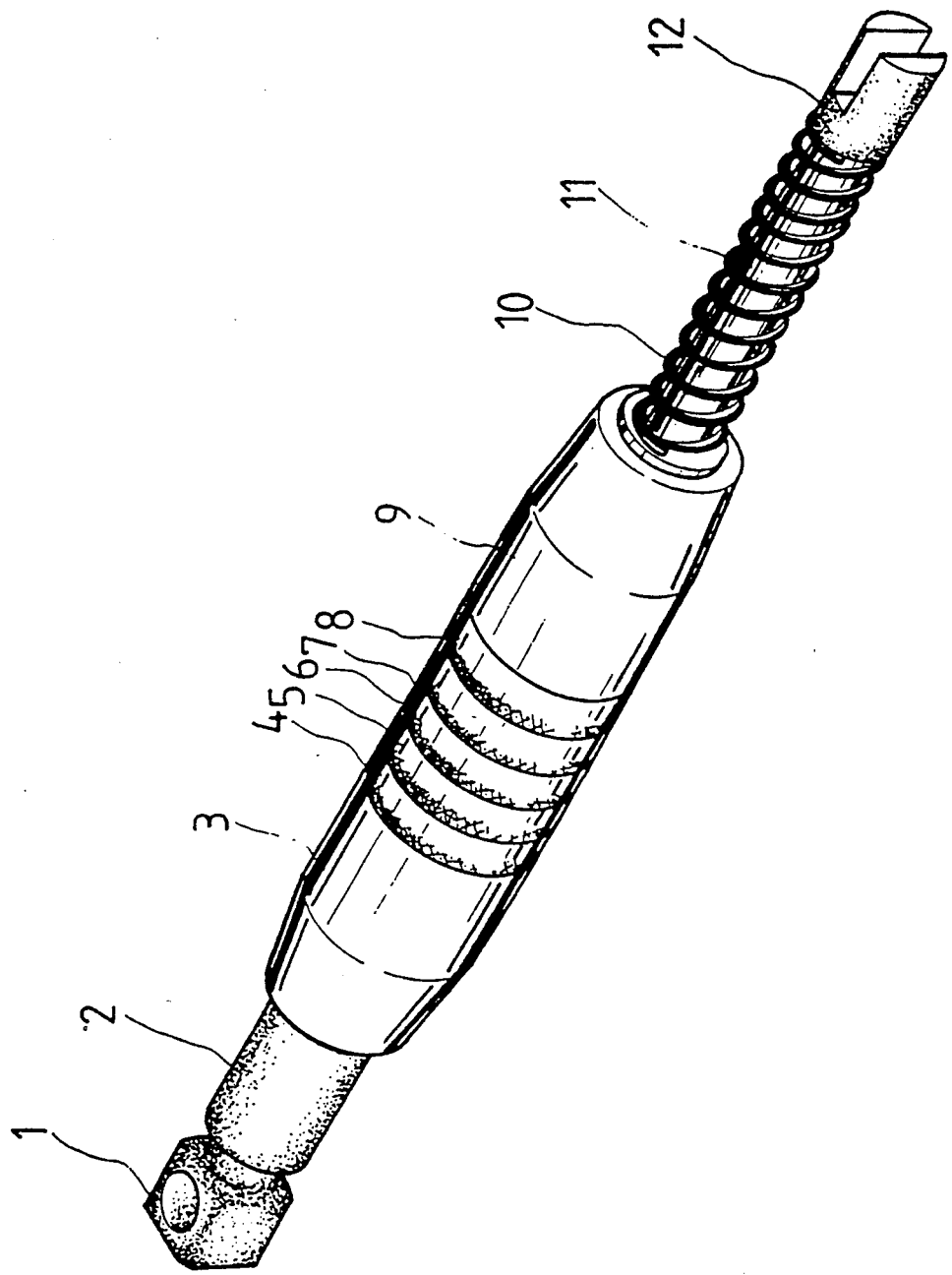
FIG. 1 is a perspective view of the present invention.

The present invention is further described in detail, with reference to the accompanying drawings, as follows:

FIG. 1 illustrates a perspective view of the present invention, which mainly comprises a fixing head 1, a movable sleeve 2, a lock head member 3, a combination ring-I 4, a combination ring-II 5, a combination ring-III 6, a combination ring-IV 7, a combination ring-V 8, a lock tail member 9, a spring 10, an extension rod 11, and a ratchet strip jaw 12.

Figure 2:
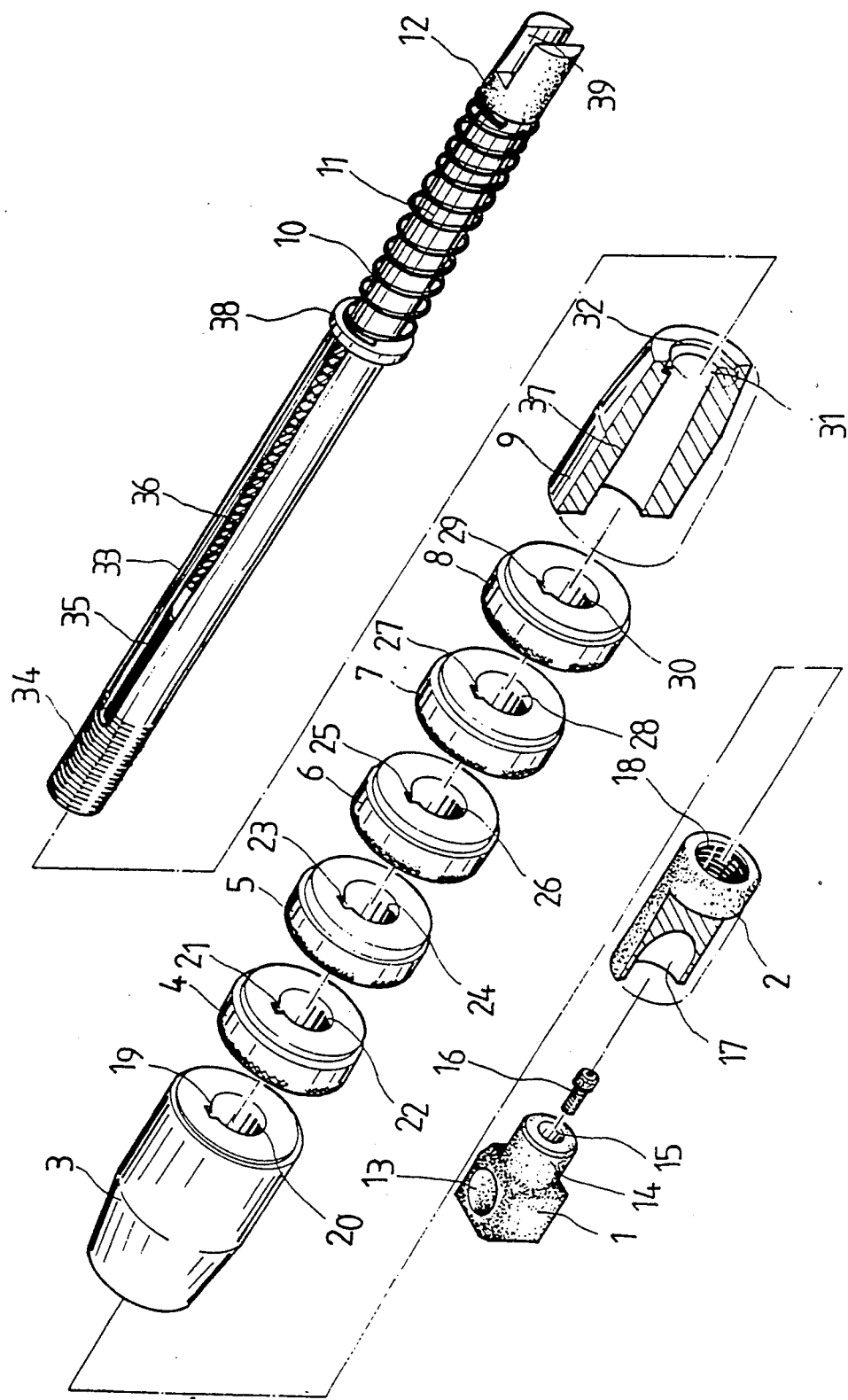
FIG. 2 is a disassembled view of the present invention.

FIG. 2 illustrates the disassembled view of the present invention, in which the fixing head 1 is furnished with a shift rod hole 13 and a projected portion 14 with a screw hole 15 for fitting a screw 16 therein so as to fix the shift rod in the shift rod hole 13. The front end of the movable sleeve 2 is furnished with a socket 17 for receiving the projected portion 14, while the rear end of the movable sleeve 2 is furnished with female threads 18 for engaging with the threaded head 34. The lock head member 3 has a shaft hole 20 for receiving a main rod 33; the shaft hole 20 has a kerf 19. Each of the combination rings-I, -II, -III, -IV and V 4, 5, 6, 7 and 8 has a shaft hole such as 22, 24, 26, 28 and 30. Each of the shaft holes is furnished with kerfs such as 21, 23, 25, 27 and 29 for fitting a toothed strip 36; the lock tail member 9 also has a kerf 37. One end of the main rod 33 has a threaded head 34, which is to pass through the lock tail member 9 the combination rings 4, 5, 6, 7 and 8, and the shaft holes 20, 22, 24, 26, 28 and 30, and finally is to be engaged with the female threads 18 in the movable sleeve 2. The toothed strip 36 can be moved within the slot 35 in the main rod 33, and is passing through the main rod tail 38 to be coupled together with the extension rod 11. The extension rod 11 is connected with the ratchet strip jaw 12. The spring 10 is retractively mounted between the main rod tail 38 and the ratchet strip jaw 12; the ratchet strip jaw 12 has a slot 39 to be mounted against the ratchet strip.

Figure 3:
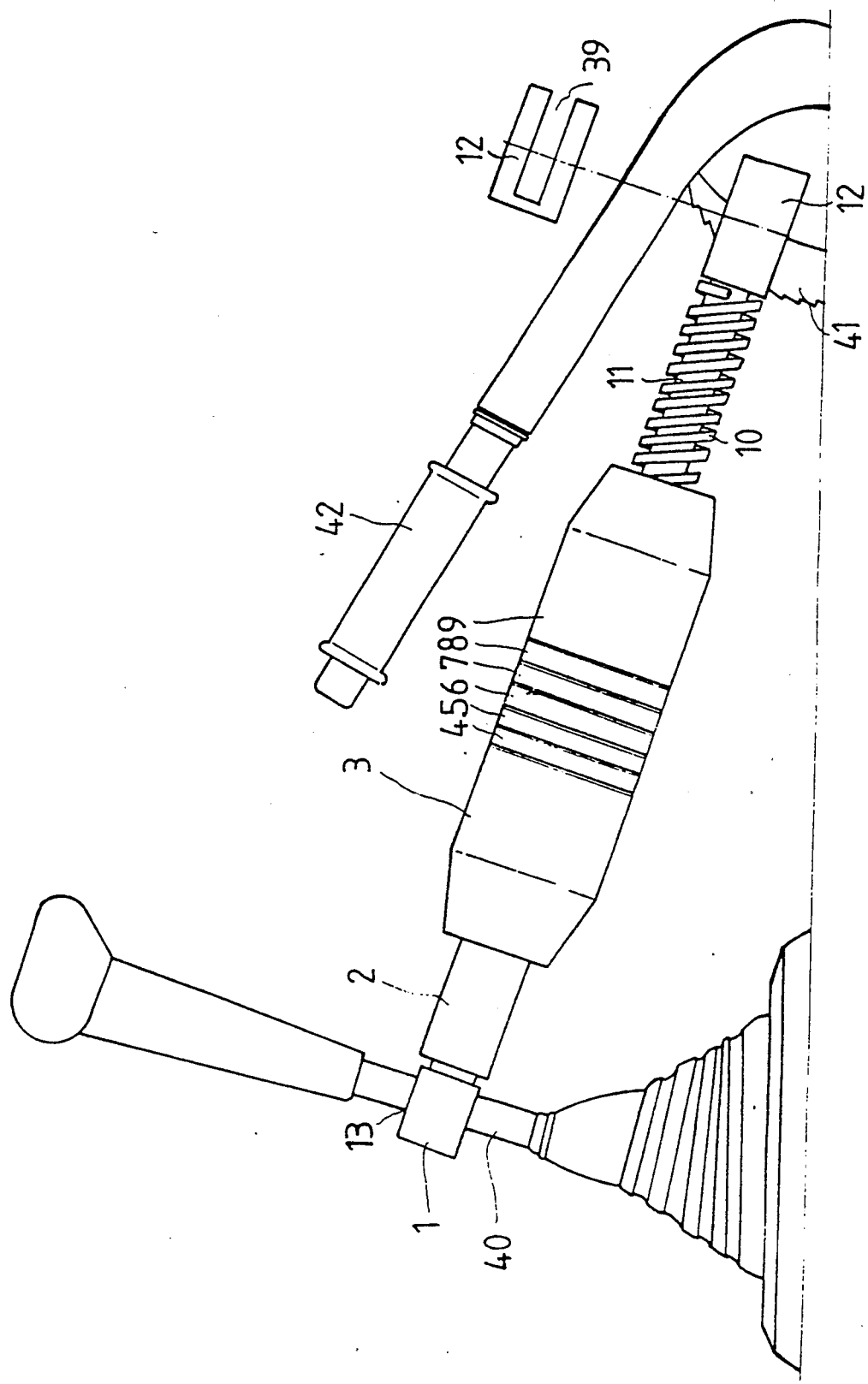
FIG. 3 illustrates the embodiment of the present invention being mounted for real use.

FIG. 3 illustrates the present invention being mounted in place for real use. The shift rod 40 is fixedly mounted in the shift rod hole 13, while the slot 39 is mounted against the ratchet strip 41. Upon the present invention being mounted between the shift rod 40 and the ratchet strip 41 of the hand-brake 42, the shift rod 40 has to set in a gear, and the hand-brake 42 has to be pulled up so as to have the present invention set in a car to achieve dual functions of preventing a burglar to steal a car.

Briefly, the combination lock according to the present invention can provide a dual lock functions for the shift rod and the hand-brake. The present invention is deemed a new and novel disclosure in terms of space utilization.

I claim:

1. A combination lock for the shift rod and the hand-brake rod of a car comprising:
    a fixing head for locking the shift rod, and said fixing head being furnished with a shift rod hole and a projected portion, and said projected portion having a screw hole;
    a movable sleeve having a socket at its front end and female threads in its rear end;
    a lock head member, of which the center core is furnished with a shaft hole and a kerf;
    a plurality of combination rings, and each of said combination rings having a shaft hole and a kerf;
    a lock tail member having a shaft hole and a kerf;

a main rod having a threaded head, a slot at one side of said rod, and main rod tail;
a spring;
an extension rod, of which the front end being connected with a toothed strip, while the rear thereof being formed into one piece with a ratchet strip jaw; and said toothed strip of said extension rod being movably mounted in the slot of said main rod, and said extension rod being movably mounted in the center of said main rod tail; and said spring being mounted between said ratchet strip jaw and said main rod tail in a retractable manner; and said main rod being mounted in place after passing through the shaft holes of said lock tail member, said combination rings, and said lock head member respectively; and said toothed strip passing through the said kerfs respectively, and then said main rod being fitted with the female threads in said movable sleeve.

2. A combination lock as claimed in claim 1, wherein said fixing head is to be fixedly mounted on said shift rod by using a screw through a screw hole in said projected portion of said fixing head.

3. A combination lock as claimed in claim 1, wherein the rear end of said ratchet strip jaw is furnished with a slot.

* * * * *